United States Patent
Wang

(10) Patent No.: US 10,472,014 B2
(45) Date of Patent: Nov. 12, 2019

(54) BABY SEAT OF BICYCLE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 58 days.

(21) Appl. No.: 15/869,100

(22) Filed: Jan. 12, 2018

(65) Prior Publication Data

US 2019/0217911 A1    Jul. 18, 2019

(51) Int. Cl.
  *B62J 11/00*    (2006.01)
  *B62J 1/16*    (2006.01)
  *B62J 1/02*    (2006.01)

(52) U.S. Cl.
  CPC .. *B62J 1/16* (2013.01); *B62J 1/02* (2013.01)

(58) Field of Classification Search
  CPC ....... B62J 1/16; B62J 7/04; B62J 1/007; B62J 1/08; B62J 1/002; B62J 1/00; B60N 2/2812; B60N 2/286
  See application file for complete search history.

(56) References Cited

U.S. PATENT DOCUMENTS

| | | | | |
|---|---|---|---|---|
| 3,873,127 | A * | 3/1975 | McNichol, Jr. | B62J 1/00 280/202 |
| 4,030,648 | A * | 6/1977 | Johnson | B62J 1/16 224/415 |
| 4,033,091 | A * | 7/1977 | Saponara | B65B 31/047 215/228 |
| 4,053,091 | A * | 10/1977 | Martelet | B62J 1/16 224/415 |
| 4,367,829 | A * | 1/1983 | Kusz | B62J 7/04 224/415 |
| 4,440,331 | A * | 4/1984 | Schimmels | B60N 2/2848 224/415 |
| 4,592,592 | A * | 6/1986 | Peek | B62J 1/16 297/243 |
| 4,964,551 | A * | 10/1990 | O'Donovan | B62J 1/16 224/415 |
| 4,998,744 | A * | 3/1991 | Drexler | B62J 1/16 280/202 |
| D332,877 | S * | 2/1993 | Newbold | D6/333 |
| 5,299,818 | A * | 4/1994 | Newbold | B62J 1/16 224/415 |
| 5,850,958 | A * | 12/1998 | Belanger | B62J 1/02 224/415 |

(Continued)

*Primary Examiner* — Shin H Kim
(74) *Attorney, Agent, or Firm* — Leong C. Lei

(57) ABSTRACT

A baby seat is provided for a bicycle and includes a seat base including a seat base body, a seat base net, and a seat base fixing member, which fixes the seat base net to a top surface of the seat base body; a back including a back body, a back net, and a back fixing member. The back body is connected, in an upright manner, with a lower end thereof, to a rear end of the seat base body. The back fixing member fixes the back net to the front surface of the back body. In this way, the present invention helps improves comfortableness and ventilation for a baby or child sitting thereon and also helps increase space for article storage.

13 Claims, 11 Drawing Sheets

(56) References Cited

U.S. PATENT DOCUMENTS

| | | | | |
|---|---|---|---|---|
| 6,173,980 B1* | 1/2001 | Newbold | | B62J 1/16 |
| | | | | 224/415 |
| 6,315,364 B1* | 11/2001 | Fujita | | A47C 7/24 |
| | | | | 297/452.56 |
| 7,131,691 B2* | 11/2006 | Ziegler | | B62J 1/12 |
| | | | | 297/215.12 |
| 7,523,986 B2* | 4/2009 | Jefferson | | B62J 1/16 |
| | | | | 297/195.13 |
| 8,251,388 B2* | 8/2012 | Sauceda | | B62J 1/16 |
| | | | | 224/415 |
| 8,851,569 B2* | 10/2014 | Ho | | A47D 13/025 |
| | | | | 297/250.1 |
| D727,640 S * | 4/2015 | Carell | | D6/333 |
| 9,463,727 B2* | 10/2016 | Styn | | B60N 2/6009 |
| 9,663,169 B2* | 5/2017 | Blom | | B62J 1/16 |
| D814,809 S * | 4/2018 | Kok | | D6/333 |
| 2003/0080594 A1* | 5/2003 | Geyer | | B62J 1/00 |
| | | | | 297/215.13 |
| 2006/0267386 A1* | 11/2006 | Nakhla | | B29C 44/1271 |
| | | | | 297/250.1 |
| 2007/0046085 A1* | 3/2007 | Knaven | | B62J 1/16 |
| | | | | 297/250.1 |
| 2010/0052283 A1* | 3/2010 | Sauceda | | B62J 1/16 |
| | | | | 280/202 |
| 2010/0187873 A1* | 7/2010 | Geyer | | B62J 1/00 |
| | | | | 297/215.13 |
| 2011/0193315 A1* | 8/2011 | Kim | | B62J 1/00 |
| | | | | 280/282 |
| 2016/0075390 A1* | 3/2016 | Blom | | B62J 1/16 |
| | | | | 297/327 |
| 2017/0349132 A1* | 12/2017 | Garatea | | B62J 1/16 |
| 2018/0057088 A1* | 3/2018 | Karelse | | A47D 1/10 |

* cited by examiner

BABY SEAT OF BICYCLE

BACKGROUND OF THE INVENTION

(a) Technical Field of the Invention

The present invention generally relates to an accessory of a bicycle, and more particularly to a baby seat of a bicycle.

(b) Description of the Prior Art

Bicycles have been very popular due to being environmentally friendly, consuming no energy, and providing an effect of exercise.

Bicycles that are currently available can be classified in two groups, one for exercise and the other for transportation. The transportation bicycles also provide an effect of light exercise and are more popular. However, most of bicycles are designed for use by a single person. For families having young babies, it is not possible for the parents to ride a bicycle with a baby.

A parent-child bicycle has been proposed, in which a seat is mounted on an upper tube extending between the bicycle cushion and the handlebar in order to receive a baby or a child to sit thereon. This design, however, places the baby or child between the body of the rider and the handlebar of the bicycle. This causes interference with the operation of the bicycle by the rider and may readily lead to uncontrollability of the bicycle or even more dangerous situations, such as falling.

Another design has been also available in which a baby seat is mounted on a rear carrier frame of a bicycle. This arrangement provides better and more securely mounting of the seat and does not cause interference with the operation of the bicycle by the rider, and thus having better safety of operation. Such a bicycle baby seat is generally made up of a seat part and a back. The seat part and the back are generally made of a rigid material, such as plastics or metals. When a child sits on the seat, the hips and the back of the child would feel uncomfortable due to hotness and sultriness. This is an issue that requires further improvement by the manufacturers.

SUMMARY OF THE INVENTION

In view of the above, in order to improve the problem of the prior art bicycle child seat that hotness and sultriness may occur during sitting on the seat, the present invention provides a baby seat of a bicycle, which generally comprises: a seat base, which comprises a seat base body, a seat base net, and a seat base fixing member, wherein the seat base fixing member fixes the seat base net to a top surface of the seat base body; a back, which comprises a back body, a back net, and a back fixing member, wherein the back body is connected, in an upright configuration, to a rear end of the seat base body with a lower end thereof and the back fixing member fixes the back net to a front surface of the back body. In this way, the present invention helps improves comfortableness and ventilation for a baby or child sitting thereon and also helps increase space for article storage.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
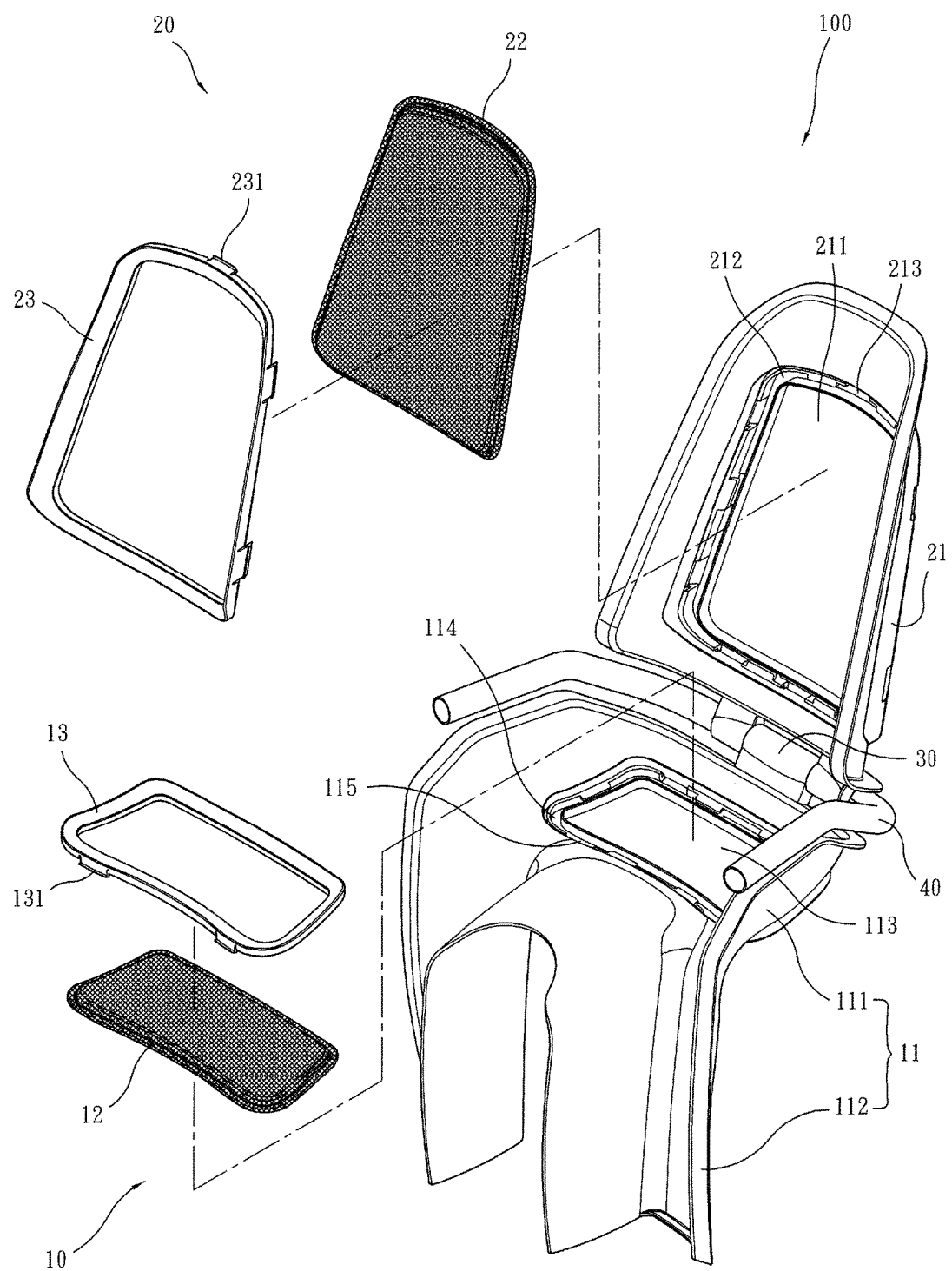
FIG. 1 is an exploded view illustrating a first preferred embodiment of the present invention.
Figure 2:
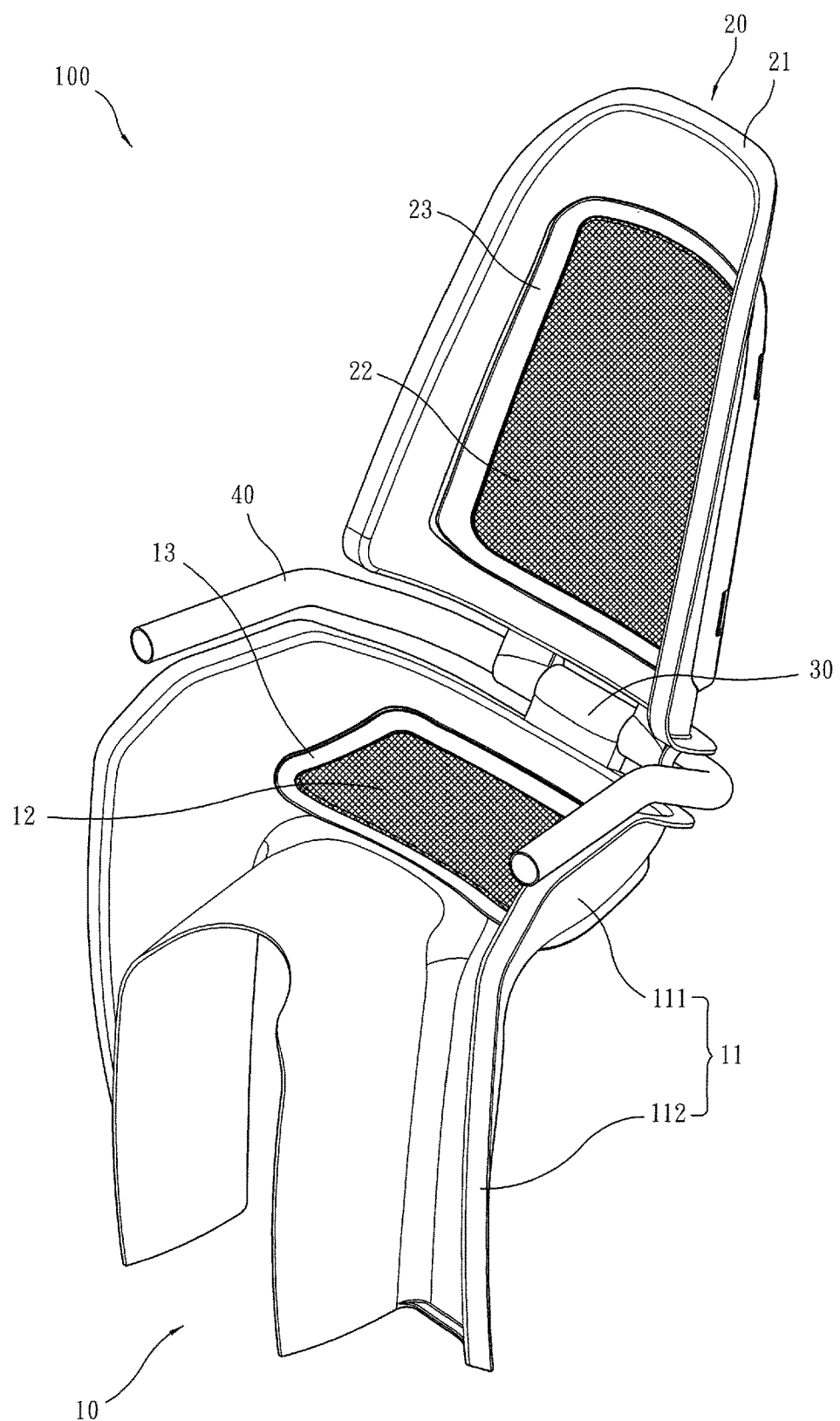
FIG. 2 is a perspective view showing the embodiment shown in FIG. 1 in an assembled form.
Figure 3:
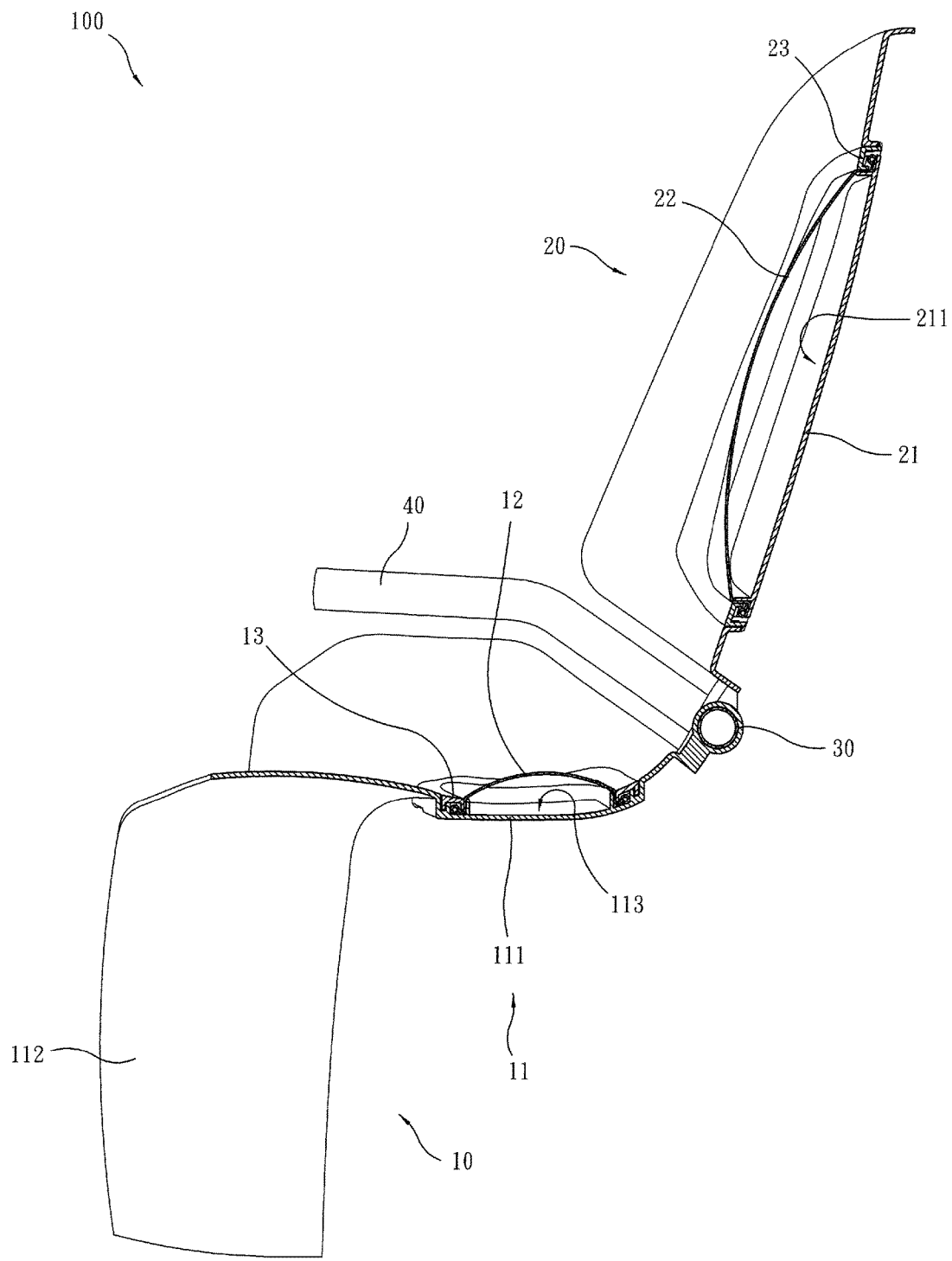
FIG. 3 is a cross-sectional view of the embodiment shown in FIG. 1.
Figure 4:
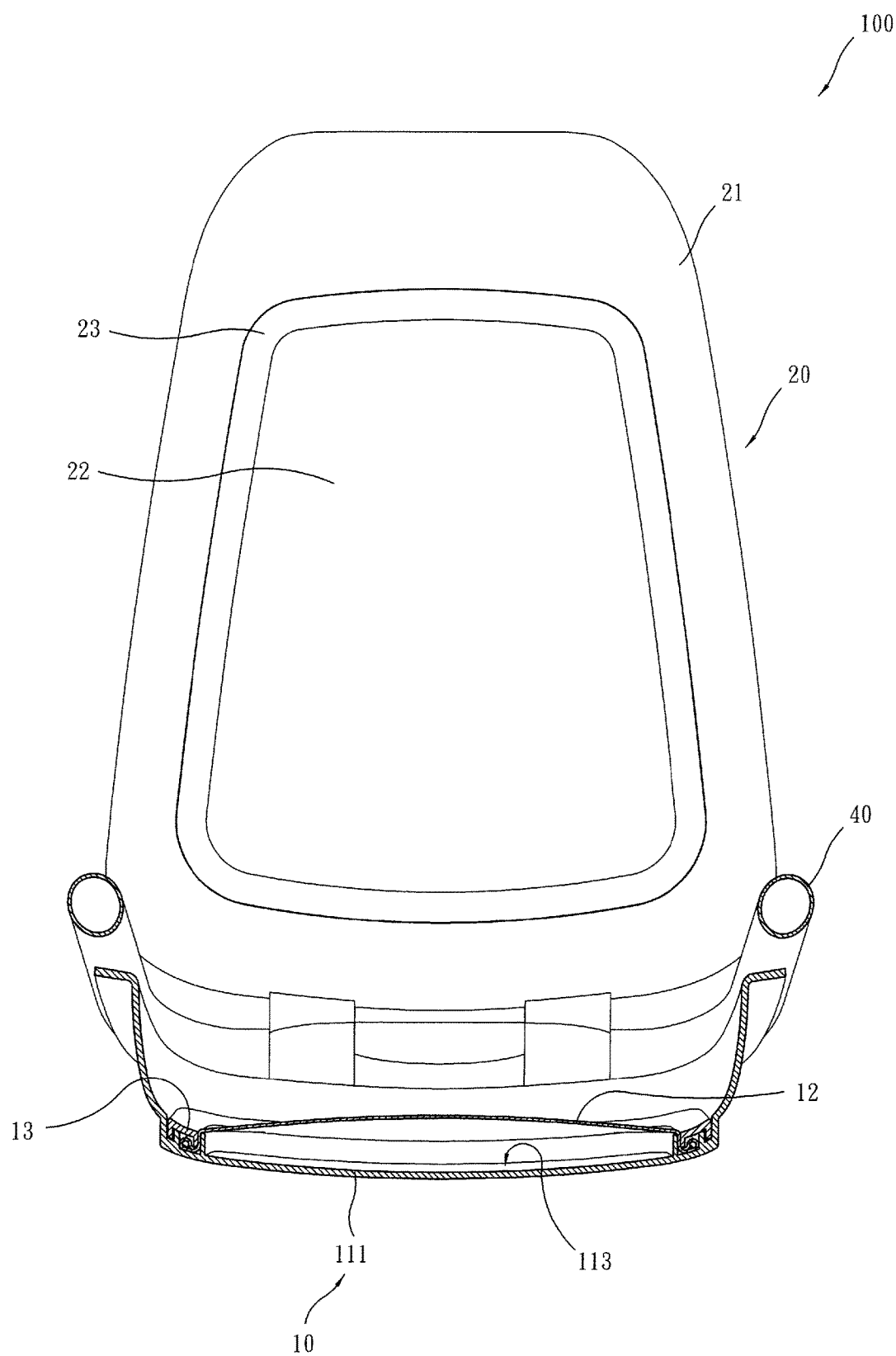
FIG. 4 is another cross-sectional view of the embodiment shown in FIG. 1.

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-5, a bicycle baby seat constructed according to a first preferred embodiment of the present invention, generally designated at 100, is shown, comprising a seat base 10, a back 20, a coupler 30, and an armrest member 40.

Referring to FIGS. 1-4, the seat base 10 comprises a seat base body 11, a seat base net 12, and a seat base fixing member 13. The seat base body 11 is integrally formed of a plastic material as a unitary structure. The seat base body 11 comprises a seat part 111 and a leg part 112 extending downward from a front end of the seat part 111. The seat part 111 functions to receive the hips of a baby or child to sit thereon and the leg part 112 functions to receive the legs of the baby or child therein. The seat part 111 has a top surface that is partly recessed to form a seat base accommodation area 113 and a seat base coupling area 114 located around a circumference of the seat base accommodation area 113 and having a recessed configuration. The seat base net 12 is in the form of a net having a periphery positioned against the circumference of the seat base accommodation area 113. The seat base fixing member 13 is a centrally-hollowed frame and is positioned on a circumferential portion of the seat base net 12 to be attachable, in a releasable manner, to the seat base coupling area 114 of the seat base body 11 in order to constrain and couple the seat base net 12 to the seat part 111 of the seat base body 11.

Referring to FIGS. 1-4, the back 20 comprises a back body 21, a back net 22, and a back fixing member 23. The back body 21 is integrally formed of a plastic material as a unitary structure. The back body 21 functions to support the back of the baby or child leaning thereon. The back body 21 has a front surface that is partly recessed to form a back accommodation area 211 and a back mounting area 212 located around a circumference of the back accommodation area 211 and having a recessed configuration. The back net 22 is in the form of a net having a periphery positioned against the circumference of the back accommodation area 211. The back fixing member 23 is a centrally-hollowed frame and is positioned on a circumferential portion of the back net 22 to be attachable, in a releasable manner, to the back mounting area 212 of the back body 21 in order to constrain and couple the back net 12 to the back body 21.

Referring to FIGS. 1-4, the coupler 30 is connected to a rear end of the seat part 111 of the seat base body 11 of the seat base 10 and a lower end of the back body 21 of the back 20 so that the back 20 is coupled, in an upright manner, to the rear end of the seat base 10 by means of the coupler 30.

Referring to FIGS. 1-4, the armrest member 40 is mounted to the coupler 30 and is set around and located above the seat part 111 of the seat base body 11 of the seat base 10 in order to allow the hands of the baby or child to hold and grip.

The above provides a description to the components, as well as assembly thereof, of the bicycle baby seat 100 according to the first preferred embodiment of the present invention, of which an explanation concerning the use and characteristics thereof will be provided below.

Figure 5:
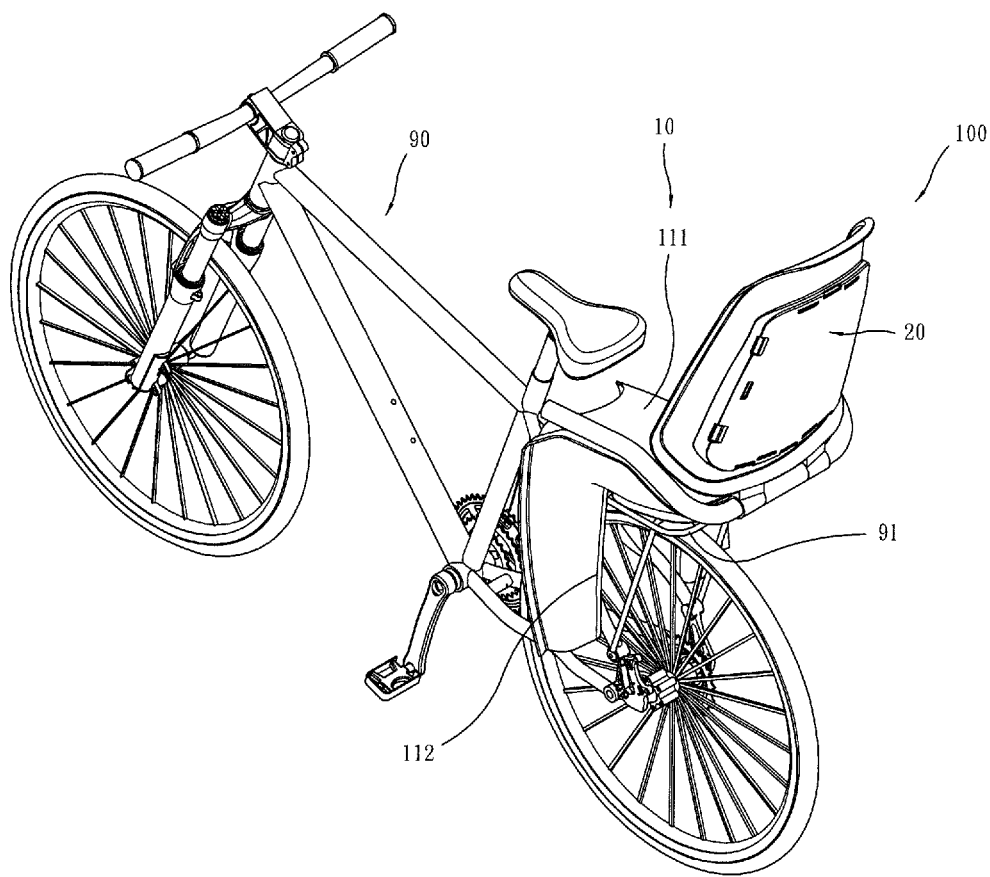
FIG. 5 is a perspective view demonstrating a condition of use of the embodiment shown in FIG. 1.

Firstly, to use the present invention, as shown in FIG. 5, the seat base 10 is mounted on a rear carrier rack 91 of a bicycle 90 so that a bicycle rider may place a baby or a child on the seat base 10 for carrying the baby or child with the bicycle in a safe manner, where the back 20 can support the back of the baby or the child to lean thereon.

Since in this invention, the seat base 10 that receives the hips of the baby or child to sit thereon is provided with the seat base net 12 that is in a form of a net, while the back 20 that supports the back of the baby or child to lean thereon is provided with the back net 22, the hips and the back of the baby or child can be supported in a resilient and comfortable manner so as to improve siting comfortableness. Further, ventilation is made better with the seat base net 12 and the back net 12 so as to reduce feeling of hotness and sultriness.

Further, in the present invention, the seat base fixing member 13 and the back fixing member 23 can be easily removed from and/or re-attached to the seat base body 11 and the back body 21 so that articles can be placed and stored in the seat base accommodation area 113 of the seat base body 11 and the back accommodation area 211 of the back 20 to increase the space of storage of articles.

Further, the seat base coupling area 114 of the seat base body 11 is provided, on a sidewall thereof, with a plurality seat base coupling slots 115, while the seat base fixing member 13 of the seat base 10 is provided, on a circumferential surface thereof, with a plurality of seat base coupling blocks 131 that are of resiliency. The seat base coupling blocks 131 of the seat base fixing member 13 are snap-fit, in a removable manner, or otherwise attached to the seat base coupling slots 115 of the seat base body 11 to provide a releasable coupling engagement therebetween. The back mounting area 212 of the back body 21 is provided, on a sidewall thereof, with a plurality of back coupling slots 213, while the back fixing member 23 of the back 20 is provided, on a circumferential surface thereof, with a plurality of back coupling blocks 231 that are of resiliency. The back coupling blocks 231 of the back fixing member 23 are snap-fit, in a removable manner, or otherwise attached to the back coupling slots 213 of the back body 21 to provide a releasable coupling engagement therebetween.

Figure 6:
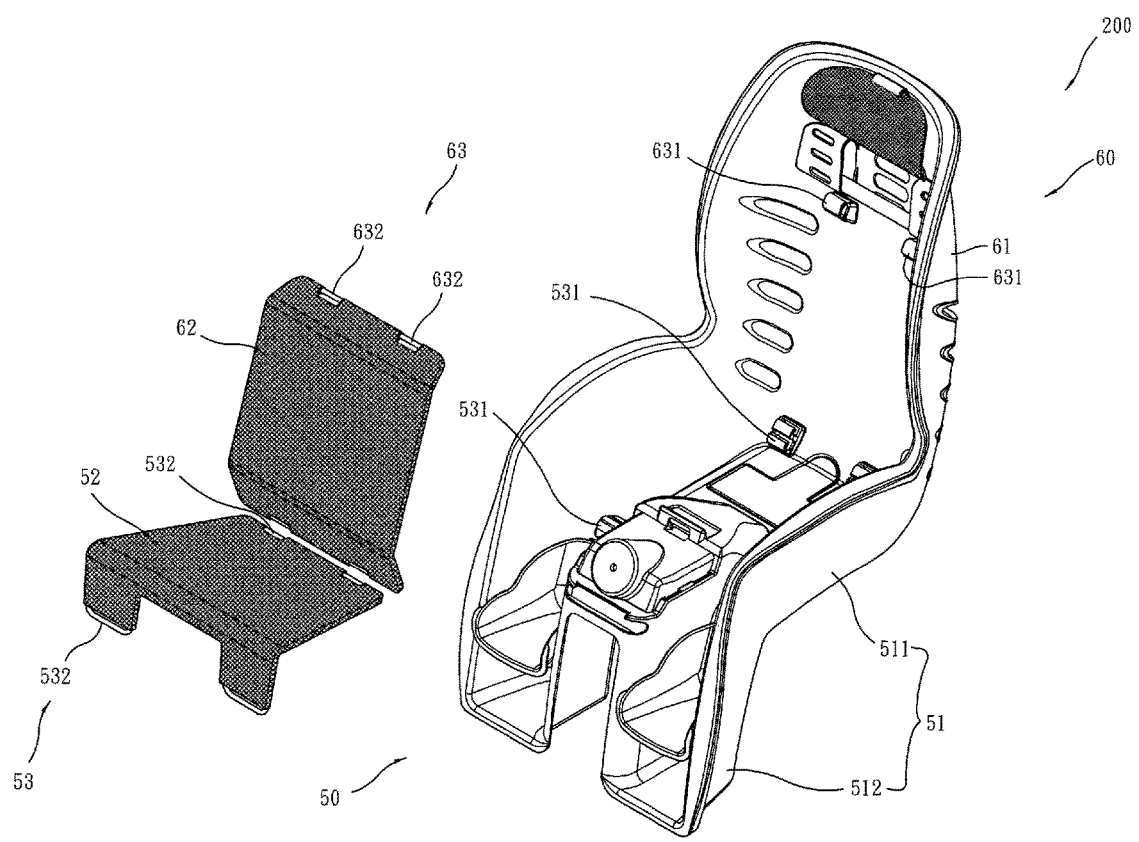
FIG. 6 is an exploded view illustrating a second preferred embodiment of the present invention.
Figure 7:
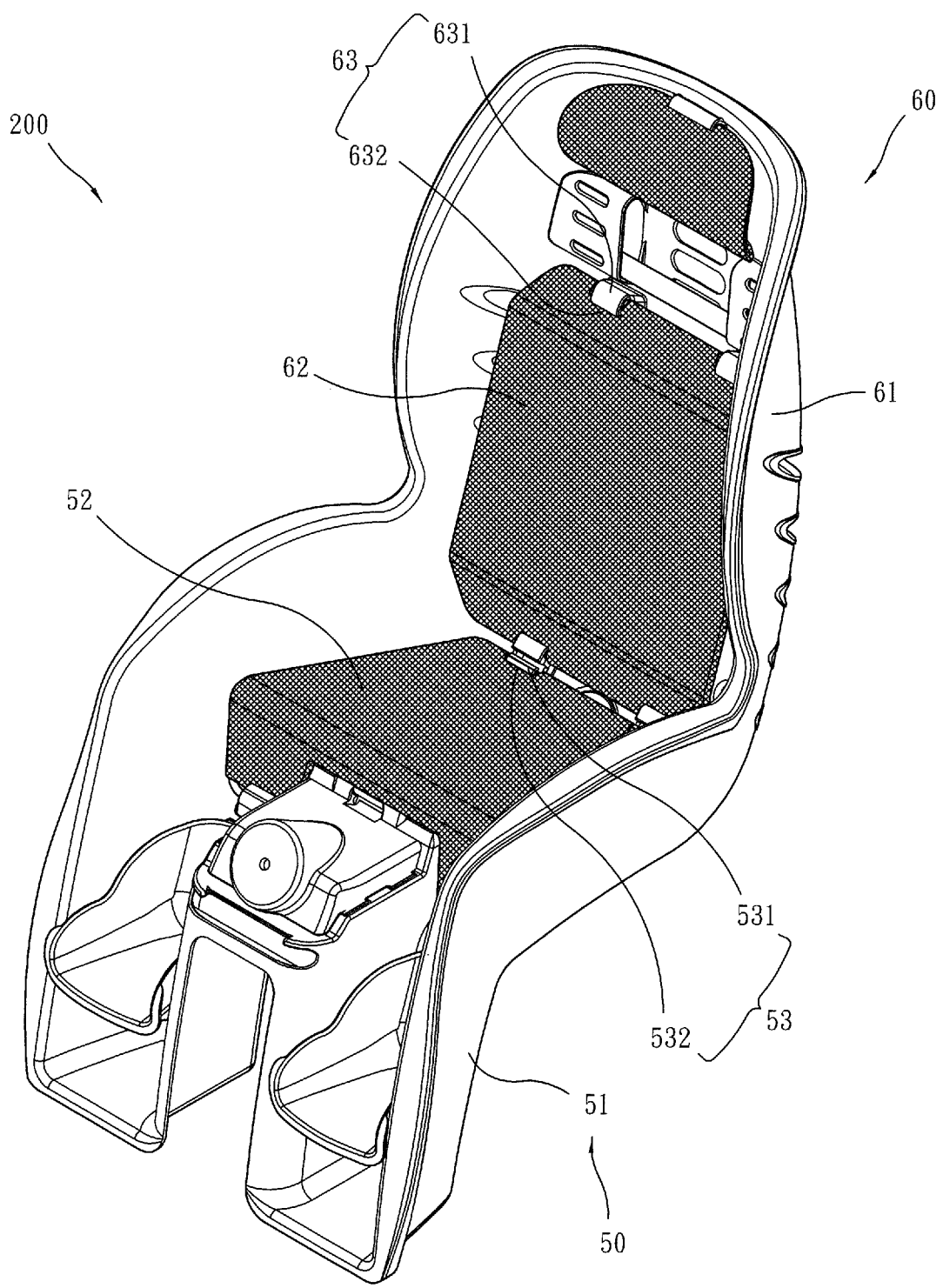
FIG. 7 is a perspective view showing the embodiment shown in FIG. 6 in an assembled form.
Figure 8:
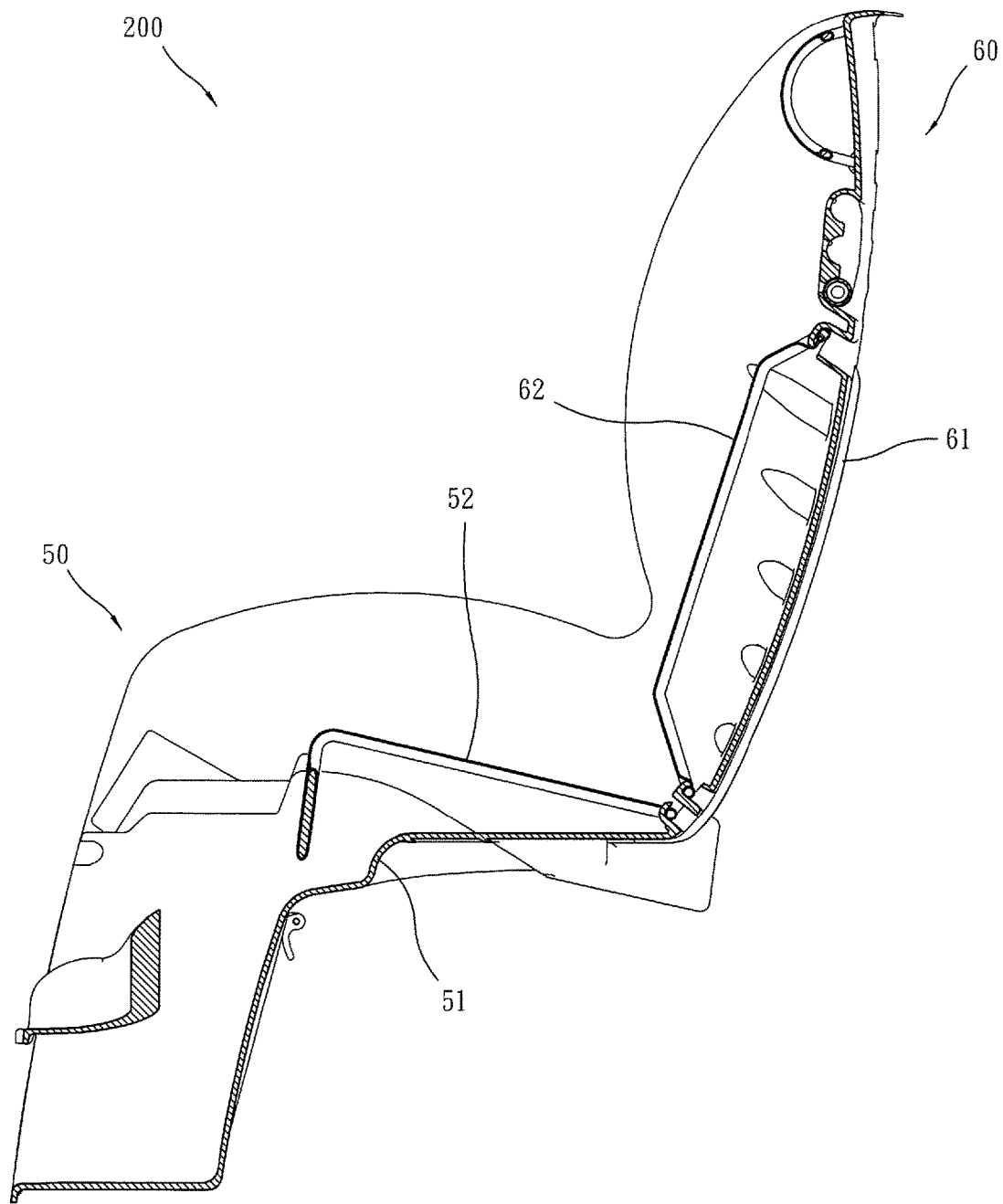
FIG. 8 is a cross-sectional view of the embodiment shown in FIG. 6.

Referring to FIGS. 6-8, a bicycle baby seat constructed according to a second preferred embodiment of the present invention, generally designated at 200, is shown, comprising a seat base 50 and a back 60.

Referring to FIGS. 6-8, the seat base 50 comprises a seat base body 51, a seat base net 52, and a seat base fixing member 53. The seat base body 51 is integrally formed of a plastic material as a unitary structure. The seat base body 51 comprises a seat part 511 and a leg part 512 extending downward from a front end of the seat part 511. The seat part 511 functions to receive the hips of a baby or child to sit thereon and the leg part 512 functions to receive the legs of the baby or child therein. The seat base net 52 is in the form of a net. The seat base fixing member 53 comprises a plurality of seat base connection blocks 531 formed on the seat base body 51 and a plurality of seat base connection slots 532 formed in a circumference of the seat base net 52, wherein the seat base connection blocks 531 and the seat base connection slots 532 are engageable with and thus connectable with each other to constrain and fix the seat base net 52 to the seat base body 51.

Referring to FIGS. 6-8, the back 60 comprises a back body 61, a back net 62, and a back fixing member 63. The back body 61 is integrally connected, as a unitary structure, to a rear end of the seat base 50 with a lower end thereof to show an upright configuration and is integrally made of a plastic material as a unitary structure. The back body 61 supports the back of a baby or child to lean thereon. The back net 62 is in the form of a net. The back net 62 and the seat base net 52 are two individual and independent components. The back fixing member 63 comprises a plurality of back connection blocks 631 formed on a front surface of the back body 61 and a plurality of back connection slots 632 formed in a circumferential portion of the back net 62, wherein the back connection blocks 631 and the back connection slots 632 are engageable with and thus connectable with each other to constrain and fix the back net 62 to the back body 61.

Although the structural arrangement of the instant embodiment is not the same as that of the first embodiment, the functionality that can be achieved is the same.

Figure 9:
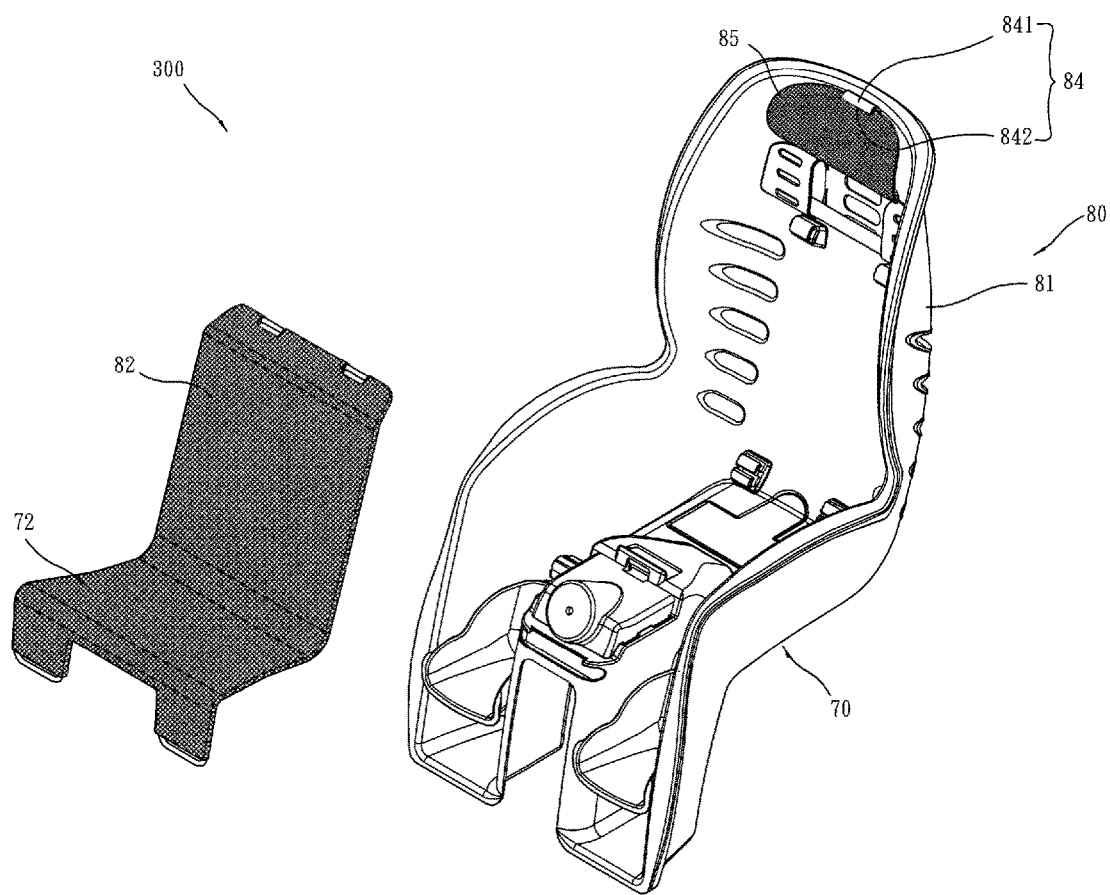
FIG. 9 is an exploded view illustrating a third preferred embodiment of the present invention.
Figure 10:
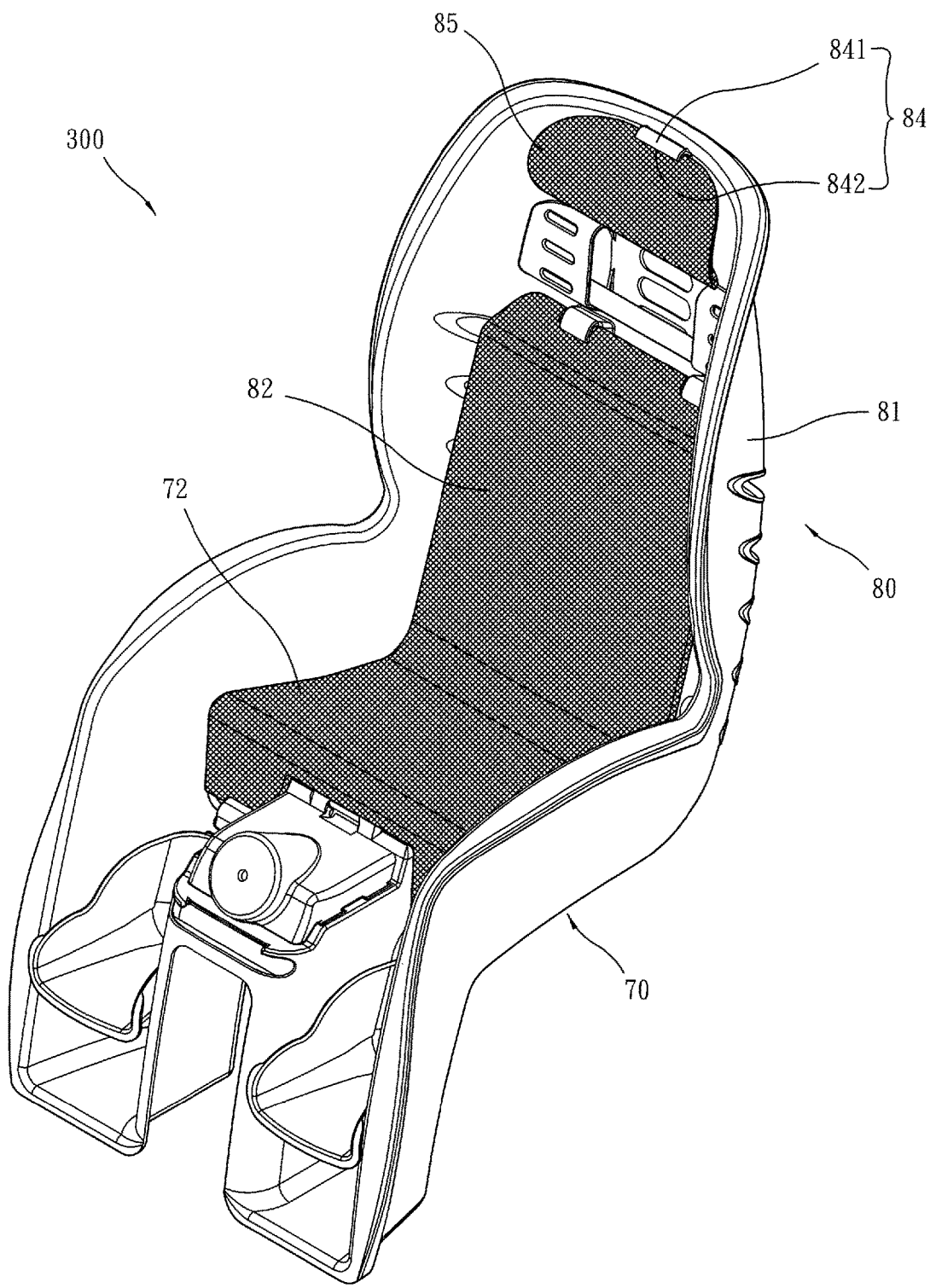
FIG. 10 is a perspective view showing the embodiment shown in FIG. 9 in an assembled form.
Figure 11:
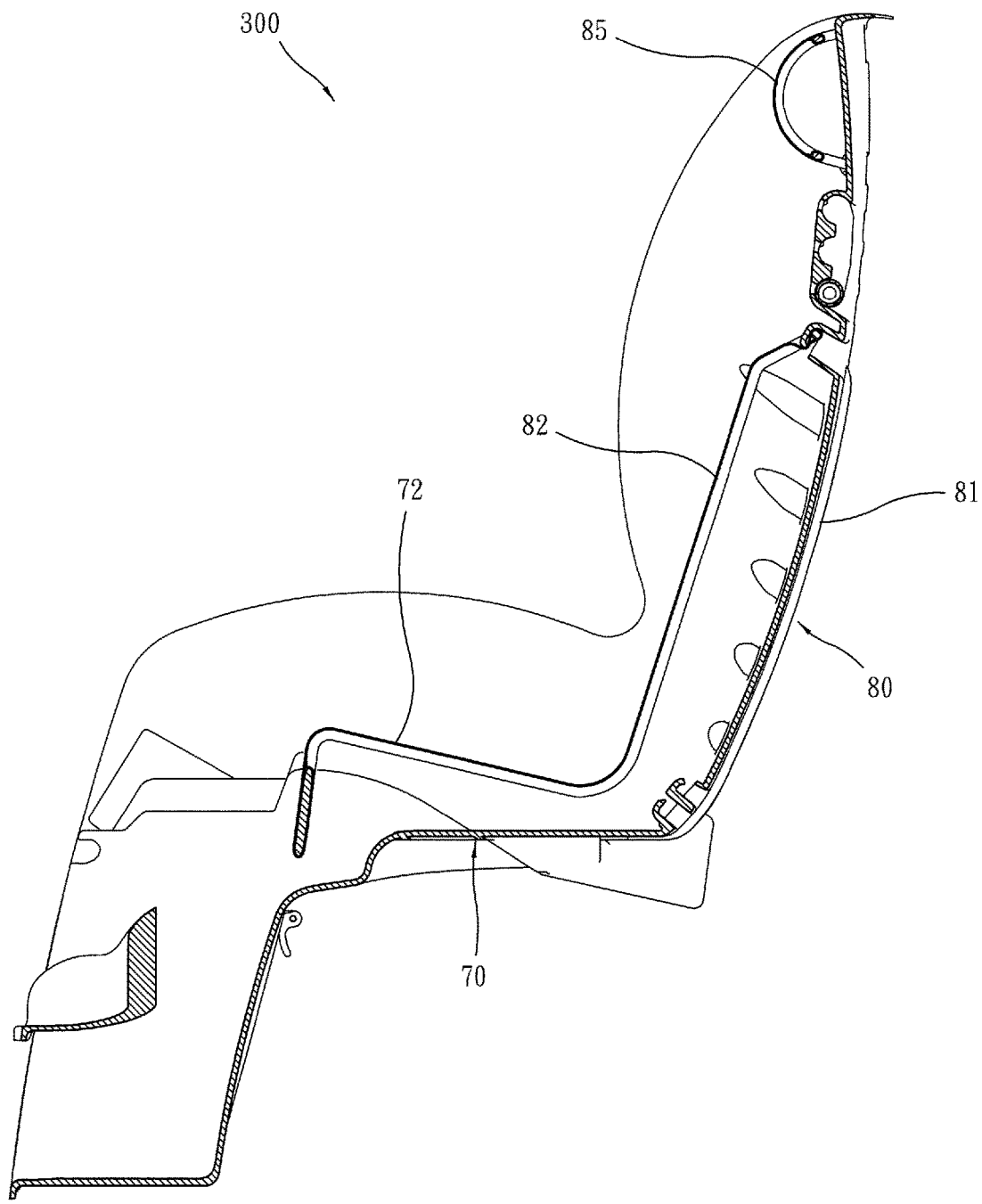
FIG. 11 is a cross-sectional view of the embodiment shown in FIG. 9.

Referring to FIGS. 9-11, a bicycle baby seat constructed according to a third preferred embodiment of the present invention, generally designated at 300, is shown, comprising a seat base 70 and a back 80. The instant embodiment is different from the second embodiment as follows:

In the instant embodiment, the seat base net 72 and the back net 82 are integrally formed together as a unitary structure.

In the instant embodiment, a pillow fixing member 84 and a pillow net 85 are included. The pillow fixing member 84 comprises a plurality of pillow connection blocks 841 formed on a front surface of the back body 81 and a plurality of pillow connection slots 842 formed in a circumferential portion of the pillow net 85, wherein the pillow connection blocks 841 and the pillow connection slots 842 are engageable with and thus connectable to each other so as to constrain and fix the pillow net 85 to a top part of the front surface of the back body 81 to support the head of the baby or child.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A bicycle baby seat, comprising:
   a seat base, which comprises a seat base body, a seat base net, and a seat base fixing member, the seat base fixing member fixing the seat base net to a top surface of the seat base body;
   a back, which comprises a back body, a back net, and a back fixing member, the back body being connected, in an upright configuration, to the seat base body, the back fixing member fixing the back net to a front surface of the back body;
   a coupler, wherein the coupler couples between a rear end of the seat base body and a lower end of the back body; and
   an armrest member, which is mounted to the coupler and is set around and located above the seat base body of the seat base.

2. The bicycle baby seat according to claim 1, wherein the seat base body and the back body are made of a plastic material and integrally formed together as a unitary structure.

3. The bicycle baby seat according to claim 1, wherein the seat base body comprises a seat part and a leg part extending downward from a front end of the seat part.

4. The bicycle baby seat according to claim 1, wherein the seat base coupling area of the seat base body is provided, in a sidewall thereof, with a plurality of seat base coupling slots and the seat base fixing member is provided, on a circumferential surface thereof, with a plurality of seat base coupling blocks that are of resiliency, the seat base coupling blocks of the seat base fixing member being attachable, in a removable manner, to the seat base coupling slots of the seat base body.

5. The bicycle baby seat according to claim 1, wherein the seat base fixing member of the seat base comprises a plurality of seat base connection blocks formed on the seat base body and a plurality of seat base connection slots formed in a circumference of the seat base net, the seat base connection blocks and the seat base connection slots being engageable with and thus connectable with each other to fix the seat base net to the seat base body.

6. The bicycle baby seat according to claim 1, wherein the back fixing member of the back comprises a plurality of back connection blocks formed on the front surface of the back body and a plurality of back connection slots formed in a circumferential portion of the back net, the back connection blocks and the back connection slots being engageable with and thus connectable o each other to fix the back net to the back body.

7. The bicycle baby seat according to claim 1, wherein the seat base net and the back net are formed together as a unitary structure.

8. The bicycle baby seat according to claim 1, wherein the seat base net and the back net are separate and independent of each other.

9. The bicycle baby seat according to claim 1 further comprising a pillow fixing member and a pillow net, wherein the pillow fixing member fixes the pillow net to a top part of the front surface of the back body.

10. The bicycle baby seat according to claim 9, wherein the pillow fixing member comprises a plurality of pillow connection blocks formed on the front surface of the back body and a plurality of pillow connection slots formed in a circumferential portion of the pillow net, the pillow connection blocks and the pillow connection slots being engageable with and thus connectable to each other to fix the pillow net to the top part of the front surface of the back body.

11. A bicycle baby seat, comprising:
    a seat base, which comprises a seat base body, a seat base net, and a seat base fixing member, the seat base fixing member fixing the seat base net to a top surface of the seat base body; and
    a back, which comprises a back body, a back net, and a back fixing member, the back body being connected, in an upright configuration, to the seat base body, the back fixing member fixing the back net to a front surface of the back body;
    wherein the top surface of the seat base body is partly recessed to form a seat base accommodation area and a seat base coupling area located around a circumference of the seat base accommodation area and having a recessed configuration, the seat base net being in the form of a net having a periphery positioned against the circumference of the seat base accommodation area, the seat base fixing member being a centrally-hollowed frame positionable on a circumferential portion of the seat base net to be attachable to the seat base coupling area of the seat base body in order to constrain and fix the seat base net to the seat base body.

12. A bicycle baby seat, comprising,
    a seat base, which comprises a seat base body, a seat base net, and a seat base fixing member, the seat base fixing member fixing the seat base net to a top surface of the seat base body; and
    a back, which comprises a back body, a back net, and a back fixing member, the back body being connected, in an upright configuration, to the seat base body, the back fixing member fixing the back net to a front surface of the back body;
    wherein the front surface of the back body is partly recessed to form a back accommodation area and a back mounting area located around a circumference of the back accommodation area and having a recessed configuration, the back net being in the form of a net having a periphery positioned against the circumference of the back accommodation area, the back fixing member being a centrally-hollowed frame positionable on a circumferential portion of the back net to be attachable to the back mounting area of the back body in order to constrain and fix the back net to the back body.

13. The bicycle baby seat according to claim 12, wherein the back mounting area of the back body is provided, on a sidewall thereof: with a plurality of back coupling slots and the back fixing member is provided, on a circumferential surface thereof, with a plurality of back coupling blocks that are of resiliency, the back coupling blocks of the back fixing member being attachable, in a removable manner, to the hack coupling slots of the back body.

* * * * *